United States Patent [19]

Angell et al.

[11] Patent Number: 4,580,835

[45] Date of Patent: Apr. 8, 1986

[54] QUICK ADJUSTING SADDLE LOCATOR

[76] Inventors: Joshua J. Angell, 59 Montford Ave.; Joseph T. Breeze, 28 Country Club Dr., both of Mill Valley, Calif. 94941

[21] Appl. No.: 595,811

[22] Filed: Apr. 2, 1984

[51] Int. Cl.⁴ .............................................. B62J 1/00
[52] U.S. Cl. ................................... 297/195; 297/345
[58] Field of Search ............... 297/195, 345, 347; 248/162.1, 404, 411; 267/58, 155

[56] References Cited

U.S. PATENT DOCUMENTS

| | | |
|---|---|---|
| 510,993 | 12/1893 | Riess . |
| 585,719 | 7/1897 | Sutton . |
| 587,672 | 8/1897 | Heyl ................... 248/404 X |
| 1,220,890 | 3/1917 | Pronovost ............... 267/58 |
| 1,405,287 | 1/1922 | Clifford ................. 248/161 |
| 2,170,098 | 8/1939 | Stephenson ............. 108/136 |
| 2,890,710 | 6/1959 | Hartman ............. 267/155 X |
| 3,861,740 | 1/1975 | Tajima et al. . |
| 4,150,851 | 4/1979 | Cienfuegos . |
| 4,156,391 | 5/1979 | Ubezio .................. 248/162.1 |

FOREIGN PATENT DOCUMENTS

| | | | |
|---|---|---|---|
| 209761 | 6/1960 | Austria ............... 248/162.1 |
| 1480037 | 3/1967 | France ................... 297/195 |
| 242764 | 11/1925 | United Kingdom ........ 267/155 |

*Primary Examiner*—William E. Lyddane
*Assistant Examiner*—Peter A. Aschenbrenner
*Attorney, Agent, or Firm*—Manfred M. Warren; Robert B. Chickering; Glen R. Grunewald

[57] ABSTRACT

A quick adjusting saddle locator for a bicycle including a quick release saddle post holding element and an external spring urging the saddle assembly toward an upper position when the saddle is released with a stop establishing a pre-set lower position and a pre-set upper position being established by the maximum expansion of the spring.

1 Claim, 6 Drawing Figures

U.S. Patent   Apr. 8, 1986   Sheet 1 of 2   4,580,835
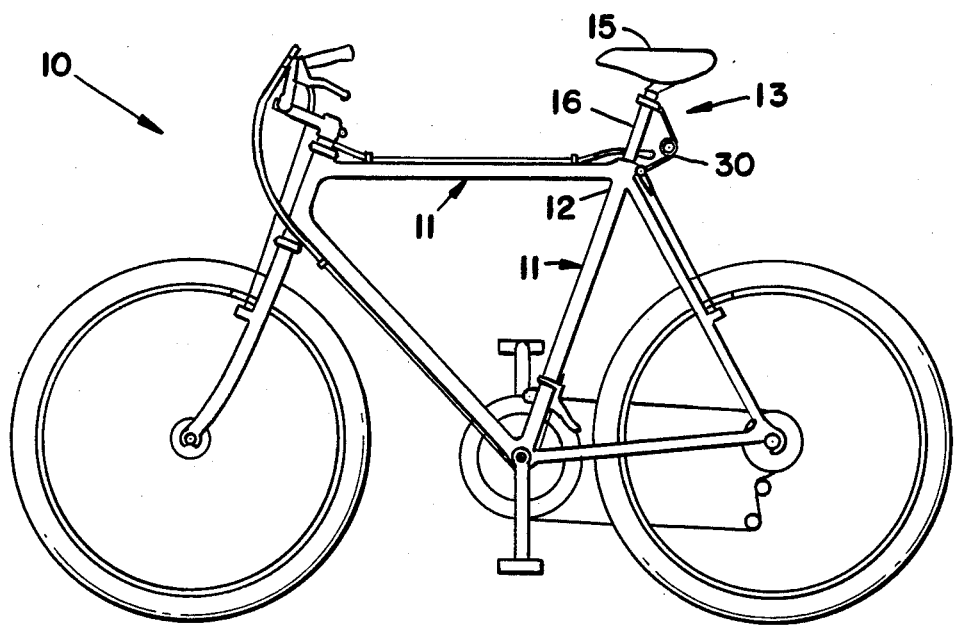
FIG_1
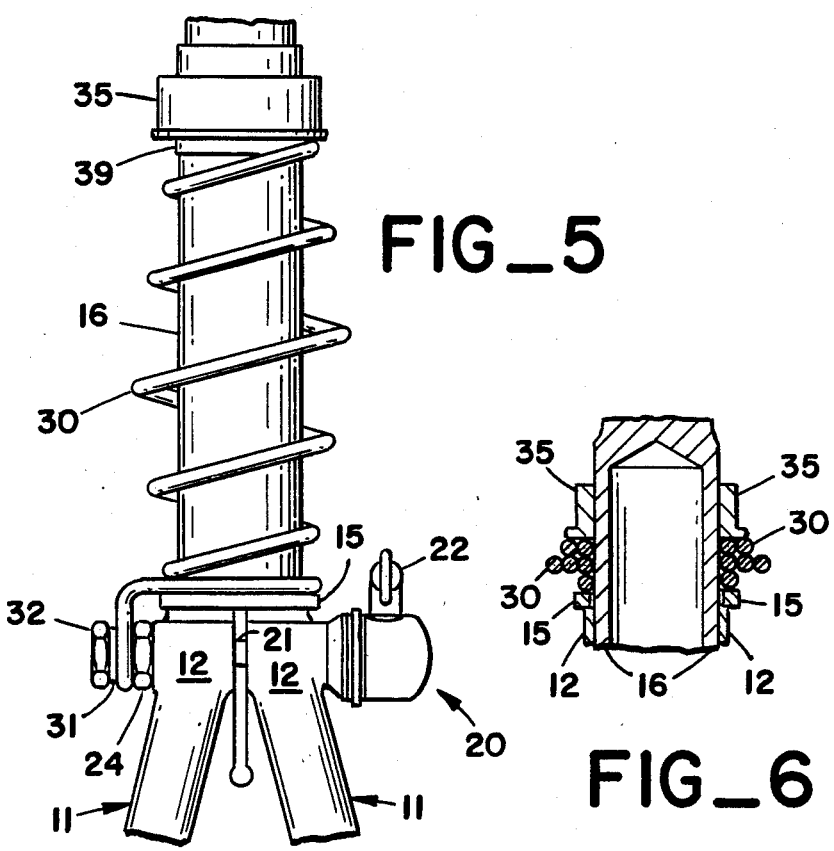
FIG_5
FIG_6

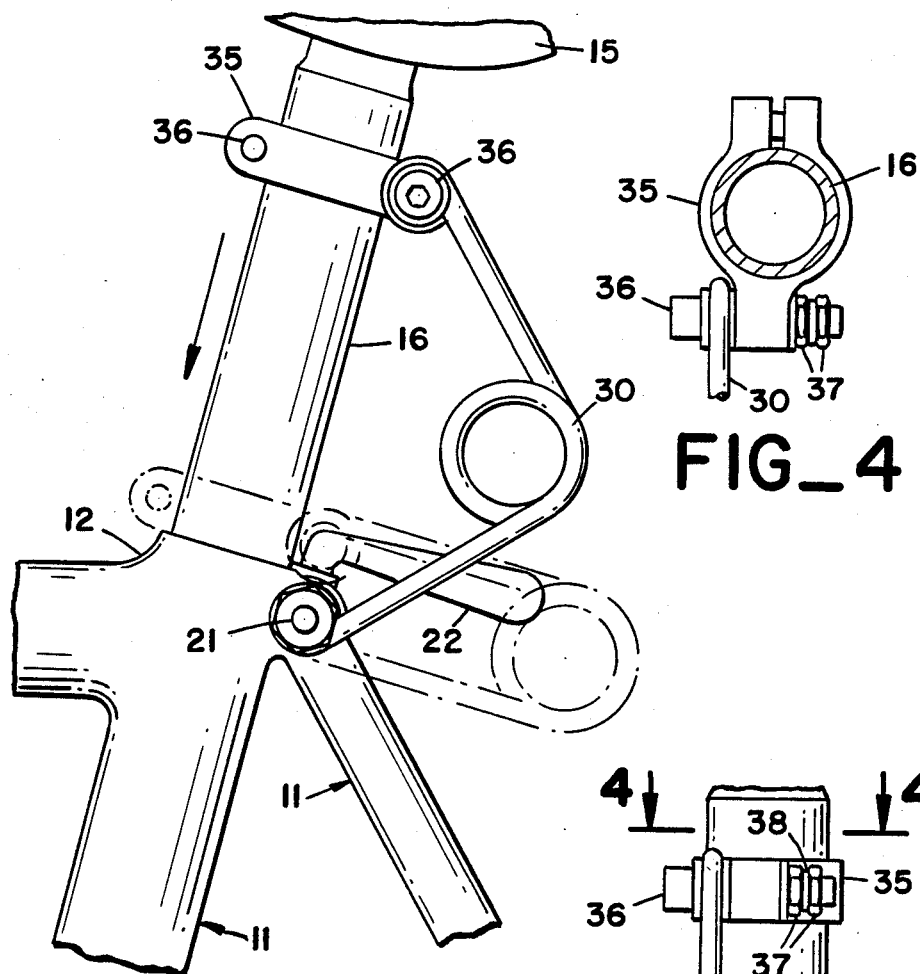
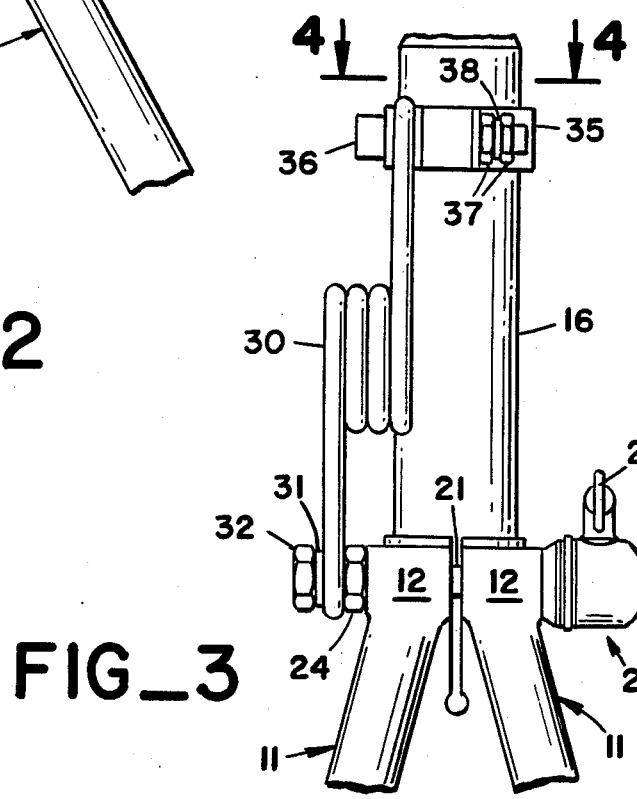

QUICK ADJUSTING SADDLE LOCATOR

FIELD OF THE INVENTION

This invention relates to an adjustable saddle for a bicycle and more particularly to a saddle that can be quickly and easily adjusted to various pre-set heights even while the bicycle is in motion.

BACKGROUND OF THE INVENTION

It is highly advantageous to provide a bicycle rider the means for changing the height of the bicycle saddle while the bicycle is in motion. Having the saddle in a pre-set low position enables the rider to dismount, mount and start the bicycle more easily and with greater stability. Once started, the saddle can be raised to the optimum pedaling height for the rider. If the rider encounters a loose road surface, the saddle height can be quickly lowered to lower the center of gravity of the rider, to improve stability and allow the rider to use his feet to control the bicycle. If the saddle height must be changed while the bicycle is in motion, the rider should be able to make the change quickly, using only one hand and to a pre-set height. Changing saddle height also should be done without changing the saddle's orientation with respect to the plane of the bicycle frame.

U.S. Pat. Nos. 4,150,851; 3,861,740; 585,719; and 510,993 are illstrative of the attempts that have been made to provide such a device. U.S. Pat. Nos. 4,150,851 and 510,993 use a spring mechanism located within the saddle tube of the bicycle frame to effectuate height adjustments to the saddle. These devices require the frame and saddle to be adapted for their use and they are not easily available for cleaning and repair. U.S. Pat. No. 585,719 discloses a rack and pinion mechanism for adjusting handlebar and saddle height while U.S. Pat. No. 3,861,740 makes use of a hydraulic system in the bicycle frame's saddle holding tube.

Although all of the prior devices disclosed in these patents provide means for adjusting saddle height, they cannot be easily and economically retro-fitted to virtually any bicycle currently in use.

SUMMARY OF THE INVENTION

Applicant's invention is a device that solves or mitigates problems associated with quick adjustment of saddle height.

It is an object of the present invention to provide a device for quick adjustment of saddle height of a bicycle that also maintains the proper alignment of the saddle with the frame.

It is an additional object of the present invention to provide such a device that can be easily and economically retrofitted to virtually any bicycle currently in use.

Another object of the present invention is to provide a saddle locator that is inexpensive to manufacture and simple to install and operate.

BRIEF DESCRIPTION OF THE DRAWINGS

FIG. 1 is an elevation view of a device embodying this invention;

FIG. 2 is a partial elevation view illustrating an enlarged view of the saddle connection of FIG. 1.

FIG. 3 is a side view of FIG. 2.

FIG. 4 is a cross-section of FIG. 3 taken along line 4—4.

FIG. 5 is a partial elevation view of another embodiment of the device of the present invention.

FIG. 6 is a partial cross-section of FIG. 5 illustrating the saddle in the pre-set lower position.

DETAILED DESCRIPTION OF THE INVENTION

FIG. 1 illustrates a bicycle, generally designated 10, having a frame generally designated 11 which includes a saddle post receiving tube 12 and a saddle assembly generally designated 13, the latter of which comprises a saddle 15 and a saddle post 16 attached thereto in a manner commonly known to the art. Saddle post 16 is of a size to telescope into tube 12.

The bicycle of the present invention is further provided with a quick release saddle post holding element 20, which is inserted into the holes (not shown) in the uppermost portion of saddle post receiving tube 12 by means of a quick release skewer 21 (see FIGS. 2, 3 and 5). Holding element 20 can be any quick release element known to the art. Holding element 20 is secured to saddle tube 12 by nut 24. Holding element 20 will usually include a cam mechanism (not shown), located within holding element 20, and handle 22, which, when rotated loosens the connection between tube 12 and saddle post 16, enabling the latter to slide axially within saddle post receiving tube 12 in a manner to be described below.

One end of a spring 30 is fixed to tube 12 by securing it between nut 24, washer 31 and lock nut 32 as shown in FIG. 3. At its other end, spring 30 is fixed to saddle post 16 by means of clamp 35, provided with bolt 36, nuts 37 and washer 38. The position of clamp 35 can be adjusted to fix spring 30 at any pre-set position on saddle post 16.

In operation, the optimum pedaling height of the rider is determined and the saddle adjusted to that height by loosening handle 22 and retightening it at the correct height. Bolt 36 is then loosened so that clamp 35 can move to its natural position on post 16 with spring 30 fully extended. Bolt 36 is then tightened and the pre-set upper position of the saddle assembly is then established with respect to frame 11. The pre-set lower position is established by clamp 35 bearing against frame 11. This position is established by loosening handle 22, sitting on the saddle and then retightening handle 22 as shown in FIGS. 2 and 6. By turning handle 22 to the locked position the rider can fix saddle assembly 13 in the pre-set lower position for mounting and starting from a stationary position. After starting, the rider can adjust the height of saddle assembly 13 simply by turning handle 22 to the unlocked position. Spring 30 will then urge saddle assembly 13 toward the pre-set upper position where the vertical displacement of saddle assembly 13 will automatically stop. If the rider wants to stop the vertical displacement of the assembly before spring 30 fully urges it to the pre-set upper position, the rider simply turns handle 22 of quick release saddle post holding element 20 to the locked position, thereby tightening saddle tube 12 around saddle post 16. It is apparent from the above description that the device of the present invention permits the rider to easily move the saddle between pre-set positions or achieve different saddle heights quickly and easily while the bicycle is stationary or in motion. Because the device is fixably mounted to the exterior of saddle tube 12 and saddle post 16, it can be used on virtually any bicycle regardless of the diameter of the bicycle's saddle tube and without modification to the bicycle. The device can be easily installed on bicycles and saddles that were not made specifically to accommodate it.

A preferred embodiment of the invention employs a torsion spring to urge the saddle to its upper position. A torsion spring expands in a plane and maintains the orientation of the saddle with respect to the bicycle frame during adjustment. In addition a torsion spring operates offset from the saddle post and does not interfere with complete vertical motion of the saddle. Specifically, as shown in broken lines in FIG. 2, clamp 35 can contact frame 11 at the lower pre-set position and torsion spring 30 does not come between those elements.

Another preferred embodiment uses a conical compression spring. A conical compression spring will urge saddle assembly 13 toward the pre-set upper position quickly and easily and will occupy only a limited space beneath the saddle in its lower positions.

In the embodiment illustrated in FIGS. 5 and 6, clamp 35 may be provided with lip 39 to help in maintaining a tight connection between the end of spring 30 and the clamp. Collar 15 is provided to hold the lowest coil of spring 30.

FIGS. 2, 3 and 4 illustrate the use of torsion spring 30 while FIGS. 5 and 6 illustrate the use of a double conical coil spring 30. FIG. 6 particularly illustrates the nesting of the coils of spring 30 in its compressed position while FIG. 2 illustrates in broken lines that no portion of torsion spring 30 is interposed between clamp 35 and frame 11 thereby providing maximum distance between the pre-set upper and pre-set lower positions.

What is claimed is:

1. A bicycle with a saddle assembly that is quickly adjustable between a preset upper position, a preset lower position and variable positions in between comprising: a bicycle frame including a quick release saddle post holding means for releasably holding a saddle post in a plurality of adjusted positions and first means to fix an end of a spring; a saddle assembly including a saddle post, received in said saddle post holding element, a releasable clamp surrounding said saddle post with said clamp including second means to fix an end of a spring, said releasable clamp being fixable to said saddle post at different axial locations along its length; a torsion spring having two ends and an intermediate torsion portion, a first end of said spring fixed to said first means and a second end of said spring fixed to said second means, said torsion spring being extendable so that its ends move in a plane that includes said saddle post and having a fully extended position defining said preset upper position.

* * * * *